United States Patent [19]

Hatakeyama et al.

[11] Patent Number: 4,820,149
[45] Date of Patent: Apr. 11, 1989

[54] APPARATUS FOR MANUFACTURING AN INJECTION-MOLDED PRODUCT HAVING A PARTLY THIN PORTION

[75] Inventors: Yoshiharu Hatakeyama, Tokyo; Tatsuo Ishikawa, Funabashi, both of Japan

[73] Assignee: Yoshida Industry Co., Ltd., Tokyo, Japan

[21] Appl. No.: 129,181

[22] Filed: Dec. 7, 1987

[30] Foreign Application Priority Data

May 28, 1987 [JP] Japan ............................. 62-129981
Jun. 3, 1987 [JP] Japan ............................. 62-138298

[51] Int. Cl.⁴ ............................................... B29C 45/30
[52] U.S. Cl. ................................... 425/555; 425/556; 425/572; 425/577; 425/588
[58] Field of Search .............. 425/554, 556, 557, 560, 425/561, 562, 572, 577, 588, 555; 264/296, 328.7

[56] References Cited

U.S. PATENT DOCUMENTS

| | | | |
|---|---|---|---|
| 4,184,835 | 1/1980 | Talbot | 425/577 |
| 4,385,025 | 5/1983 | Salerno et al. | 264/255 |
| 4,410,479 | 10/1983 | Cyriax | 264/255 |
| 4,459,256 | 7/1984 | Ziegler | 264/152 |
| 4,470,786 | 9/1984 | Sano et al. | 425/125 |
| 4,540,534 | 9/1985 | Grendol | 425/547 |
| 4,657,496 | 4/1987 | Ozeki et al. | 425/562 |

Primary Examiner—Jay H. Woo
Assistant Examiner—Timothy W. Heitbrink
Attorney, Agent, or Firm—Barnes & Thornburg

[57] ABSTRACT

An apparatus for injection molding a product having a partly thin portion includes a molding die including a male die and a female die for defining a cavity having a volume larger than a volume of the product. A gate is provided to permit molten resin material from an injection molding machine to be injected into the cavity. A slide block disposed in either the male die or the female die has in cross section a dimension corresponding to a dimension of the thin portion of the product. The slide block is movable between a retracted position where the volume of the cavity is substantially maintained and an advanced position to project into the cavity to form the thin portion. A drive is provided for moving the slide block to the advanced position before the resin material injected into the cavity is solidified. A hollow space formed in the molding die and communicating with the cavity permits an excess of the resin material to be discharged from the cavity into the hollow space during the advance of the slide block. A closure member is fitted in the hollow space for normally closing the same and is coupled to a spring for urging the closure member to the retracted position and a power drive unit for maintaining the closure member in the advanced position against the spring. The closure member is moved in synchronism with the slide block drive so that the closure member is retracted to open the hollow space substantially simultaneously with the advance of the slide block, and is advanced to reduce the volume of the hollow space immediately after the slide block reaches the advanced position. This synchronous drive supplements any shrinkage of the resin during subsequent cooling thereby preventing any occurrence of sink marks in the resulting product.

9 Claims, 5 Drawing Sheets

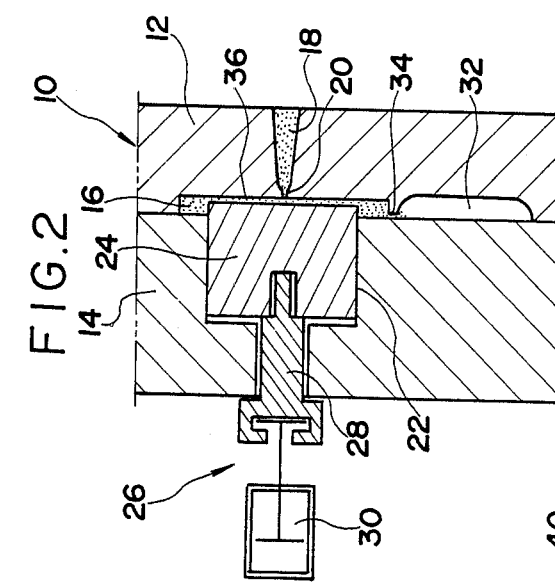
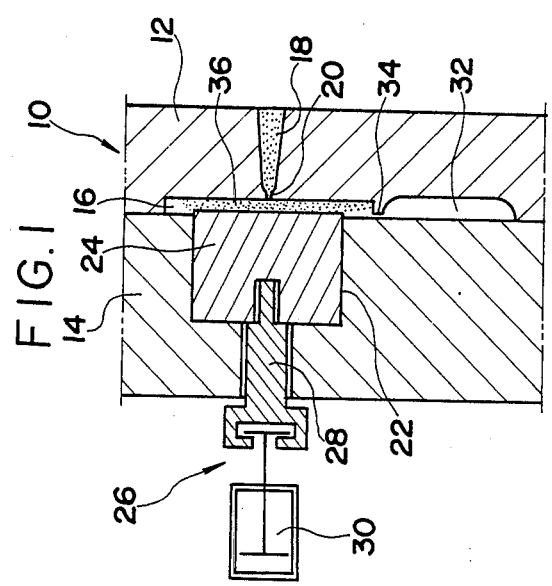
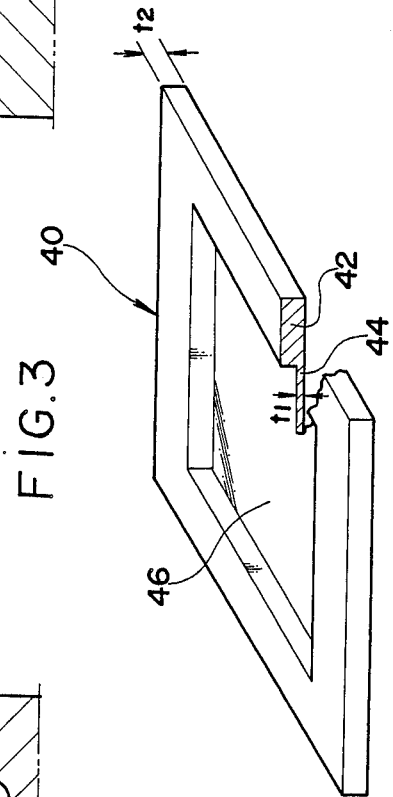

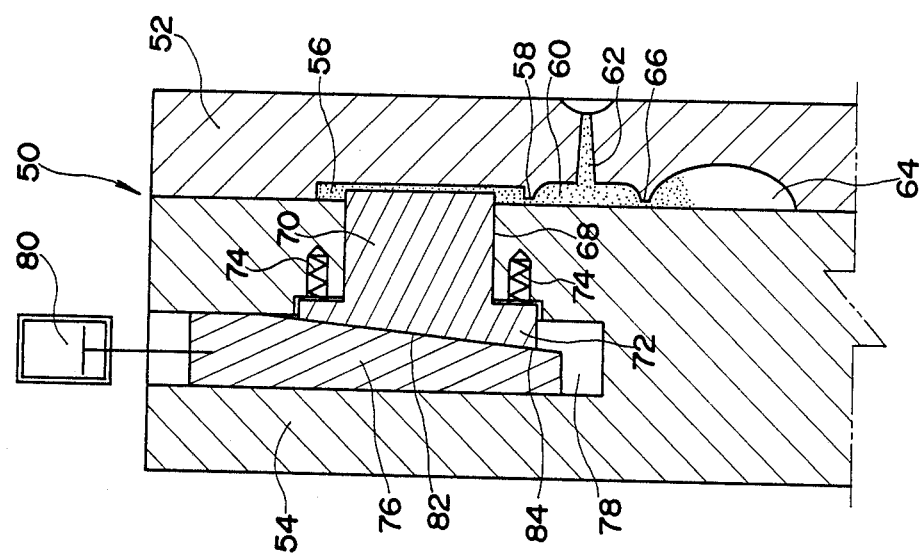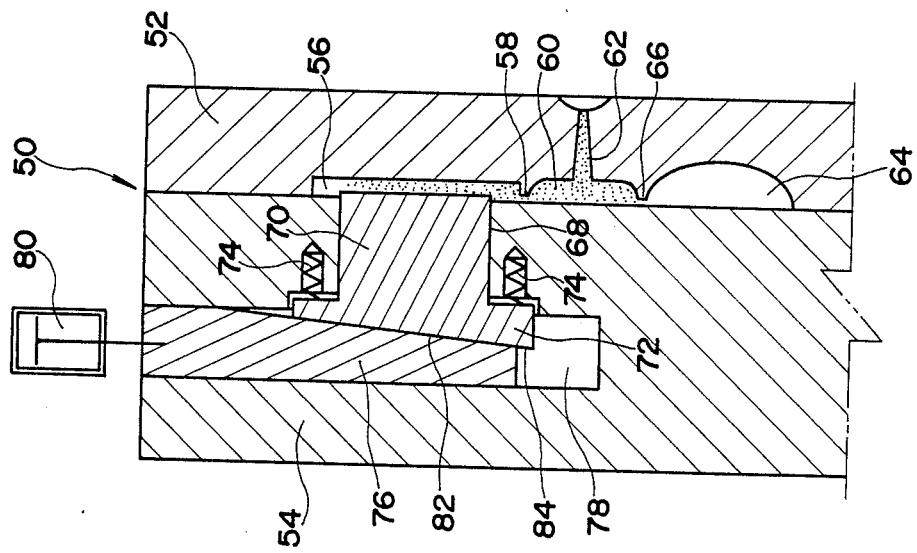

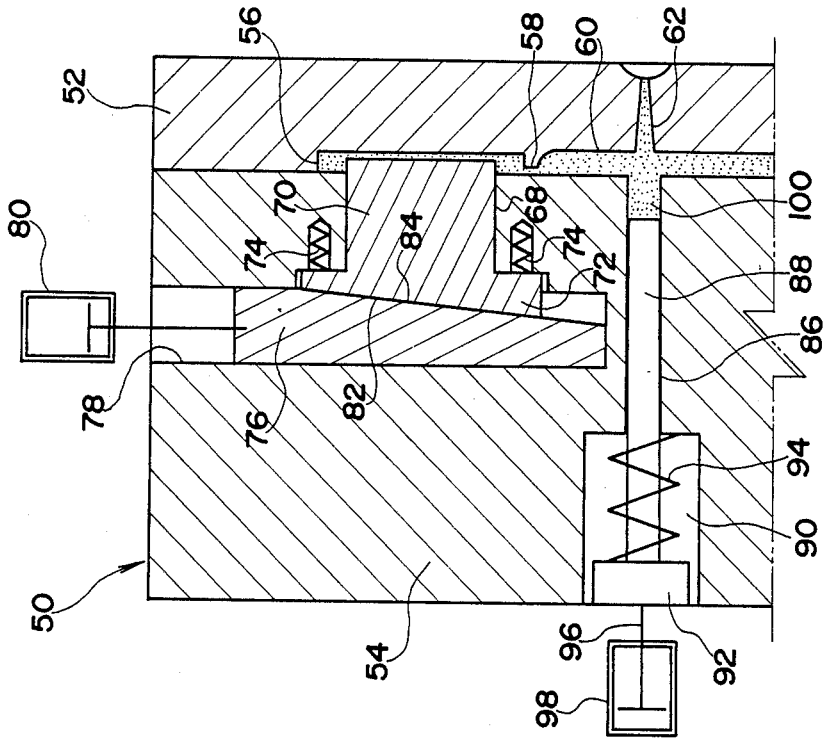
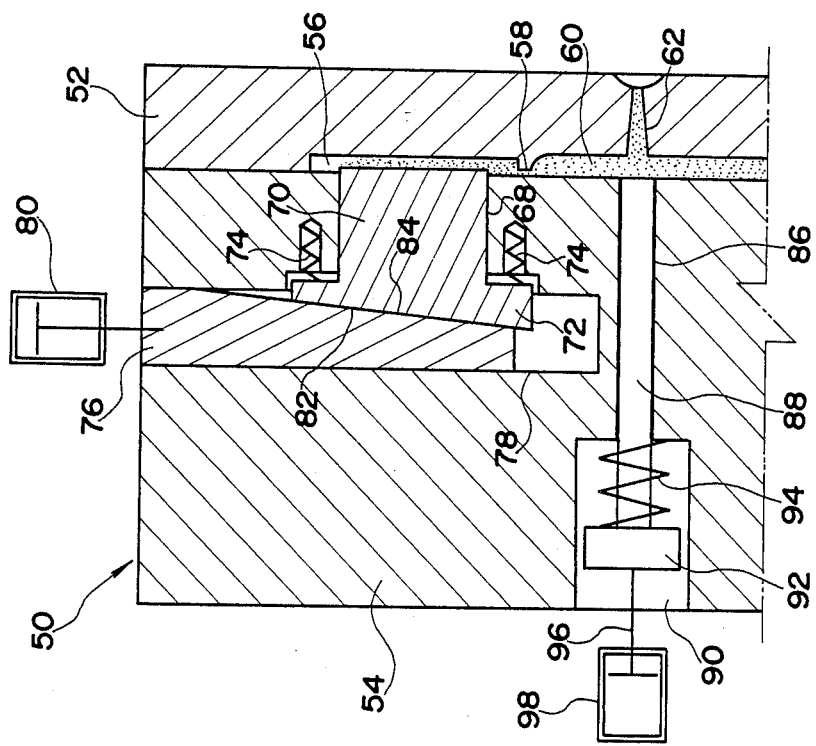

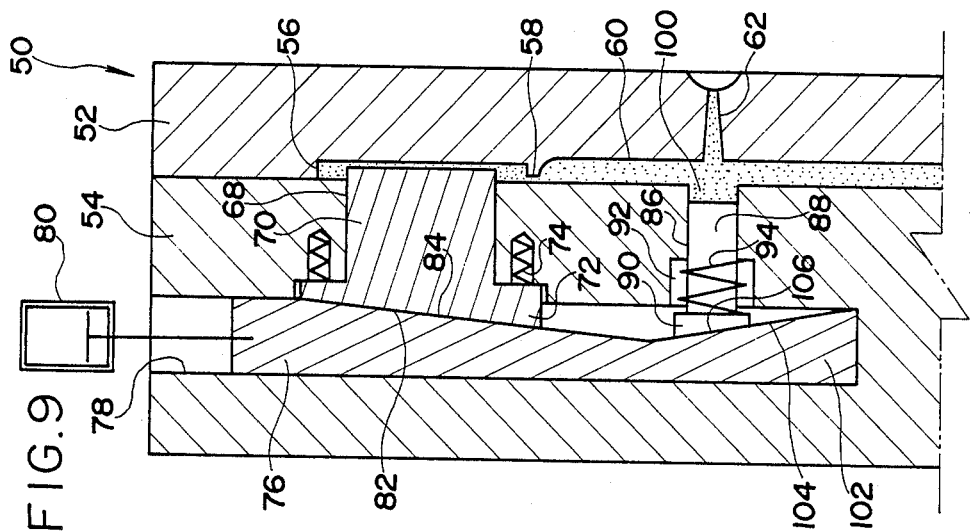
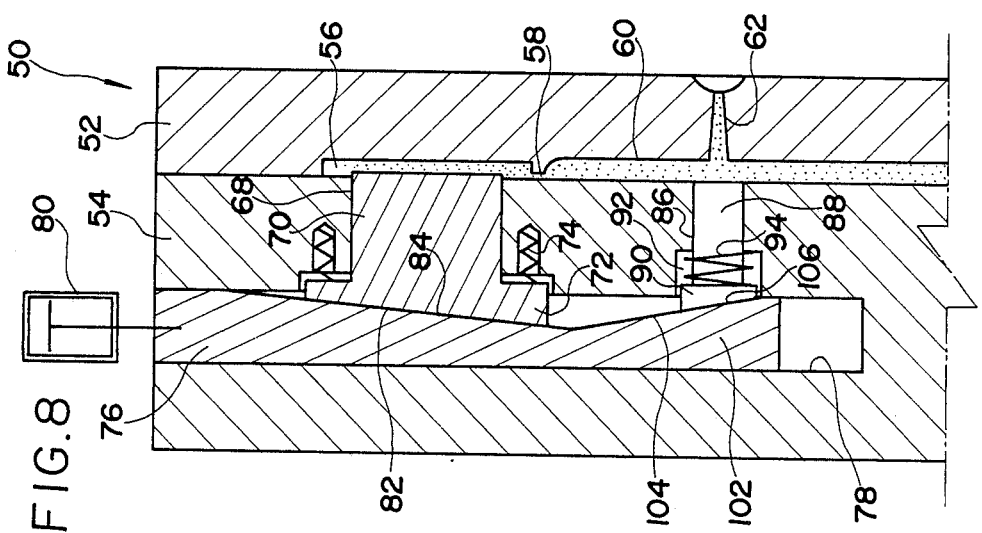

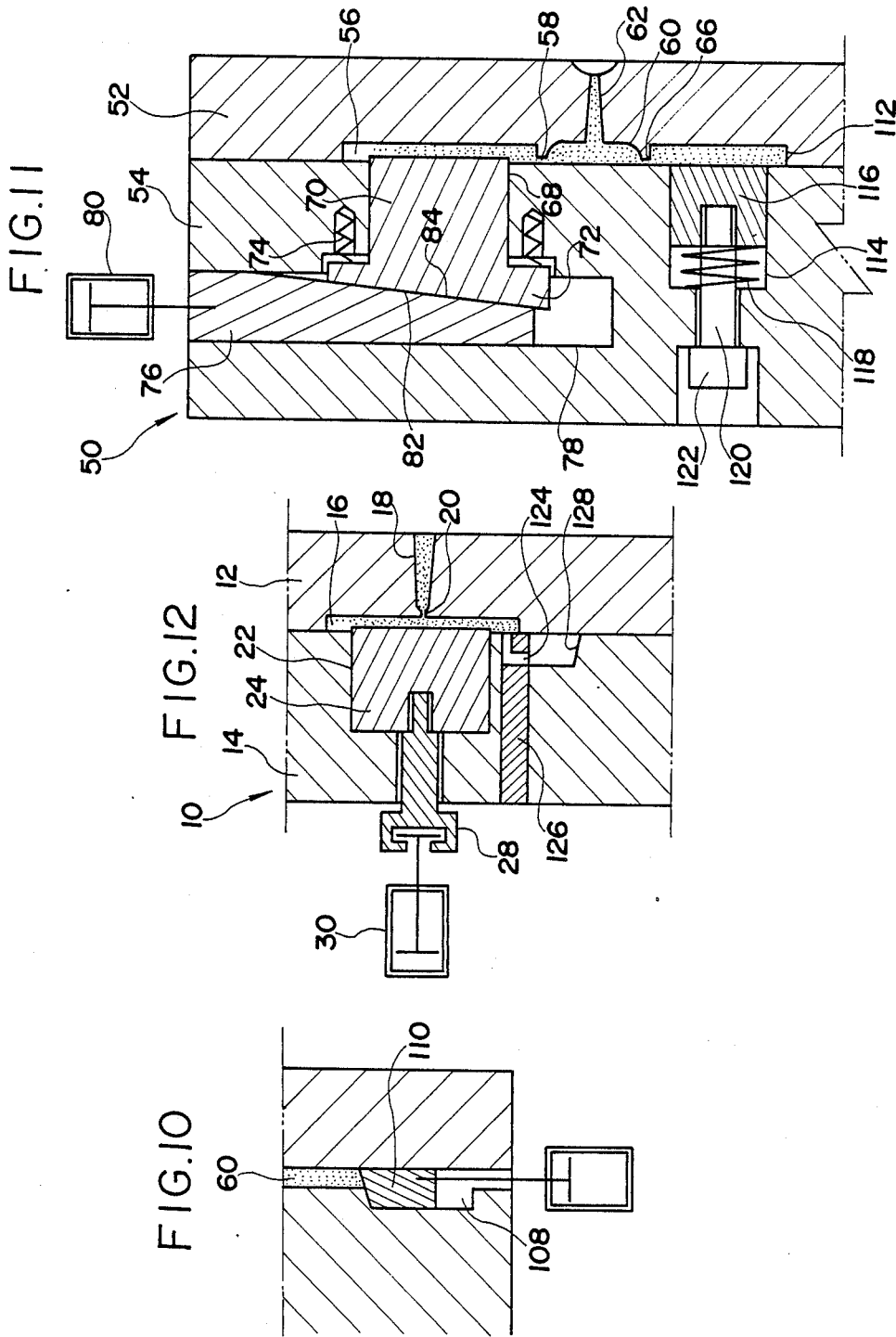

APPARATUS FOR MANUFACTURING AN INJECTION-MOLDED PRODUCT HAVING A PARTLY THIN PORTION

BACKGROUND OF THE INVENTION

1. Field of the Invention

The present invention generally relates to an injection molding of a synthetic resin material and, more particularly, to an injection-molded product having a partly thin portion and method and apparatus for injection molding such a product.

2. Description of Prior Art

As is well known, one of the most suitable methods for mass production of synthetic resin made products is the injection molding which is carried out by injecting a molten resin into a cavity defined within a molding die. The injection molding permits a product having a relatively complicated shape to be manufactured easily because of less restrictions in a design of the cavity. In the conventional injection molding, however, various problems have been experienced in the manufacture of a product having a partly thin portion.

For example, a vanity case need be provided with a concave portion for accommodating cosmetics by reducing a wall thickness of the central portion of a receptacle. In injection molding such a product, the cavity has hitherto been defined as having two areas, one for the thick peripheral portion and the other for the thin central portion of the product, before the molten resin is injected into the cavity. This has been considered satisfactory if the ratio between the thickness of central portion and the thickness of peripheral portion is relatively small, that is, if the thickness of the former is not so small compared with the thickness of the latter. However, as the above ratio increases, that is, as the area of the cavity for the central portion becomes narrower, resistance to the flow of resin material becomes larger. Thus, the resin material injected from a side gate, which opens into the cavity at a periphery thereof, tends to fill up the peripheral area of the cavity before flowing into the narrow central area. This results in an occurence of a weld mark or line on the product at the opposite side of the gate, which spoils an external appearance and reduces a mechanical strength of the product. Furthermore, an extremely narrow central area of the cavity prevents the resin from filling it up because the flow of resin concentrates a pocket of air in the cavity to the center and increases the air pressure considerably. An attempt to increase an injection pressure for overcoming the air resistance has involved a burned on the product due to a burning of the compressed air.

The above problems might be solved by providing a pin point gate opening into the cavity at a center thereof, instead of the side gate. In this case, however, a gate mark is necessarily formed on a center of the product and therefore an applicability of the pin point gate is limited. Another and more important disadvantage is that the peripheral area of the cavity tends to be insufficiently charged with the resin so that a sink mark often occurs on the product. This is because the resin is first injected into the narrow area and then flows into the peripheral area with a considerable loss of an injection pressure.

Therefore, the conventional injection molding does not permit the ratio between the thickness of the thin portion and of the thick portion to be considerably increased. For example, in a vanity case of a usual size having a wall thickness of about 5 mm at the peripheral portion, the bottom wall defining the concave portion has been formed to have a thickness of about more than 2 mm, i.e. more than 40% of the peripheral portion. Thus, the entire case has been bulky and not satisfactory.

Accordingly, an object of the present invention is to provide a method and an apparatus for injection molding a product having a partly thin portion, which enable to reduce a thickness of the thin portion to a large extent while maintaining a sufficient thickness of the remaining portion.

Another object of the invention is to provide an injection molding method and apparatus which permits an efficient manufacture of a product having a partly thin portion with a good external appearance and strength.

A further object of the invention is to provide an injection-molded product in which a thickness of a thin portion can be as small as desired.

SUMMARY OF THE INVENTION

According to the invention, an injection molding method for molding a product having a partly thin portion starts with the step of providing a molding die including a male die, a female die and a slide block disposed in one of the male and female dies, the slide block having in cross section a dimension corresponding to a dimension of the thin portion of the product. A cavity is then defined between the male and female dies with maintaining the slide block in a retracted position. After a molten resin material is injected into the cavity through a gate, the slide block is advanced to project into the cavity before the resin material is solidified, thereby filling the cavity with the resin material while forming the thin portion.

During the advance of the slide block, the resin material is pushed away toward an area of the cavity surrounding the slide block and consequently fills the cavity. A narrow area of the cavity, corresponding to the thin portion of the product, is defined by the advance of the slide block after the resin material is injected into the cavity. Therefore, the resin material can flow into a whole area of the cavity without substantial increase of resistance to the flow and substantial loss of an injection pressure.

Preferably, the resin material is injected into the cavity with an amount larger than a required amount for molding the product. The excess of the resin material may be discharged from the cavity during the advance of the slide block.

An apparatus according to the invention for injection molding a product having a partly thin portion comprises a molding die including a male die and a female die for defining a cavity therebetween, the cavity having a volume larger than a volume of the product. The molding die also includes a gate for injecting a molten resin material from an injection molding machine into the cavity. A slide block is disposed in one of the male and female dies and having in cross section a dimension corresponding to a dimension of the thin portion of the product. The slide block is movable between a retracted position whereat the volume of the cavity is substantially maintained and an advanced position to project into the cavity thereby reducing the volume thereof for forming the thin portion. A drive means is provided for moving the slide block and is adapted to advance the slide block before the resin material injected into the cavity is solidified.

Preferably, the molding die further includes a hollow space communicating with the cavity for permitting an excess of the resin material to be discharged from the cavity into the hollow space. In one embodiment of the invention, the hollow space is normally closed by a closure member fitted in the hollow space. Means for retracting the closure member is provided to open the hollow space and is synchronized with the drive means.

According to another aspect of the invention, an injection-molded product is provided which comprises a relatively thick-wall portion and a thin-wall portion formed unitarily and integrally with the relativley thick-wall portion, the thin-wall portion having a wall thickness of less than 1 mm.

Other objects, features and advantages of the invention will become apparent from the following detailed description of the invention when taken in conjunction with the accompanying drawings.

BRIEF DESCRIPTION OF THE DRAWINGS

FIG. 1 is a sectional view schematically illustrating a molding apparatus according to an embodiment of the invention;

FIG. 2 is a view similar to FIG. 1 with a slide block in an advanced position;

FIG. 3 is a partly sectioned perspective view illustrating an example of an injection-molded product according to the invention;

FIG. 4 is a sectional view showing a molding apparatus according to another embodiment of the invention;

FIG. 5 is a view similar to FIG. 4 with a slide block in an advanced position;

FIG. 6 is a sectional view of a molding apparatus according to still another embodiment of the invention;

FIG. 7 is a view showing the same apparatus as in FIG. 6 with a slide block being advanced and a closure member being retracted;

FIG. 8 is a sectional view of a molding apparatus according to further embodiment of the invention;

FIG. 9 is a view similar to FIG. 8 with a slide block in an advanced position and a closure rod in a retracted position;

FIG. 10 is a fragmentary sectional view showing a hollow space and a closure rod of a modified form;

FIG. 11 is a sectional view of a molding apparatus according to yet another embodiment of the invention; and FIG. 12 is also a sectional view showing still another embodiment of the invention.

DETAILED DESCRIPTION OF THE INVENTION

Referring first to FIG. 1 of the drawings, a molding die 10 of an apparatus according to a first embodiment of the invention includes a stationary female die 12 and a movable male die 14 which define therebetween a cavity 16 of a shape corresponding to a configuration of a product to be molded as shown, for example, in FIG. 3. Formed through the female die 12 is a sprue 18 which is connected at one end to a nozzle of an injection molding machine (not shown) of any conventional type. The sprue 18 terminates at a small-dimensioned pin point gate 20 opening in the cavity 16 at its substantially center portion. The surface of the male die 14 defining the cavity 16 is partly recessed to form a hollow space 22 in which a slide block 24 is fitted in a fluid-tight manner.

The slide block 24 has a cross-sectional shape corresponding to a thin portion of the product and is advanced or retracted by a drive means 26 connected to the end of the slide block opposite to the cavity 16. In this embodiment, the drive means 26 comprises a shaft 28 fixed to the slide block 24 and a hydraulic cylinder 30 which moves the shaft 28 to slide the block 24 in the hollow space 22. A hydraulic cylinder that is usually equipped in the injection molding machine for ejecting the molded product, may be used for the drive means 26 if so desired.

Formed adjacent to the periphery of cavity 16 is a chamber 32 which is communicated with the cavity 16 via a small passage 34. As described below, this chamber 34 is intended to permit an excessive amount of molten resin to flow thereinto when the slide block 24 is advanced. Therefore, the chamber 32 can be omitted in case that the injection molding machine enables to supply the molten resin into the cavity 16 with a precise amount required for molding the product.

A molding operation using the above apparatus will now be described. First, the dies 10 are closed and the slide block 24 is set to its retracted position as shown in FIG. 1. A molten resin 36 is then injected into the cavity 16 from the nozzle and through the sprue 18 and the pin point gate 20. The amount of resin to be injected in each cycle is predetermined to enable the molding of the product. When the slide block 24 is in its retracted position, the cavity 16 has a volume larger than the volume of the product and therefore the resin 36 does not fill up the cavity 16, leaving the marginal portion of the cavity 16 uncharged. In many cases it is difficult to carry out the injection in such a manner that the amount of injected resin precisely corresponds to the amount required for molding the product. Thus, it is preferable to supply the resin 36 with an amount larger than the calculated value so that the cavity 16, when the slide block 24 is advanced, can be prevented from incomplete charging.

Thereafter, before the resin 36 is solidified, the hydraulic cylinder 30 is actuated to advance the slide block 24 into the cavity 16 whereby the resin 36 existing in front of the block 24 is pushed away toward the marginal portion of the cavity 16. The slide block 24 continues to advance until the end surface thereof defines a narrow gap of a predetermined width in cooperation with the bottom of the cavity 16, that is, until the cavity 16 corresponds to the configuration of product to be molded. When the cavity block 24 reaches such a position, the cavity 16 is filled up with the resin 36 as illustrated in FIG. 2. The dies 10, after the resin is solidified, are released to eject the molded product as in the conventional manner.

It is necessary that the slide block 24 be advanced before the resin 36 is solidified. For example, if acrylonitrile-styrene resin is used for the molding with temperature of the dies 10 being maintained at about 60° C., a suitable timing for the advance motion of the slide block 24 is about 0.5 second after the injection of the resin. Also, in case that the excessive amount of resin 36 is injected into the cavity 16, the advance of the slide block 24 increases an internal pressure of the cavity 16, resulting in the excess of resin to flow out from the cavity 16 into the chamber 32 through the passage 32. Thus, an over packing of the resin 36 in the cavity 16 can be prevented.

FIG. 3 illustrates an example of the product thus molded. This product 40 comprises a thick-walled marginal portion 42 which has been molded in the marginal portion of the cavity 16, and a thin-walled central portion 44 which has been formed through the advance of slide block 24 and which provides a recess 46 for accommodating cosmetic material for example. The marginal portion 42 and central portion 44 are integrally and unitarily formed together, and a thickness t1 of the central portion 44 is less than one-third (⅓) of a thickness t2 of the marginal portion 42. In the present invention, the thickness t1 can be less than 1 mm. For instance, if the product 40 is designed as a part of a vanity case, the marginal portion 42 should have a thickness of at least about 5 mm in order to enable provisions of a latch tongue and/or a hinge. In that case, however, the central portion 42 can be formed with a thickness in the range of 0.5 to 0.8 mm. As the result, size and weight of the entire vanity case may be reduced while maintaining a capacity for containing the cosmetic material.

An apparatus illustrated in FIG. 4 is different from the above embodiment, mainly in a gate structure and a drive means for a slide block. Thus, the appratus also includes a molding die 50 comprising a female die 52 and a male die 54 for defining a cavity 56 therebetween. A gate is in the form of a side gate 58 opening in the cavity 56 at the peripheral portion thereof and is connected to the nozzle of injection molding machine (not shown) through a runner 60 and a sprue 62 formed in the female die 52. A chamber 64 is provided adjacent to the runner 60 opposite to the gate 58 and is communicated with the runner 60 via a passage 66 which is dimensioned smaller than the gate 58. Fitted in a hollow space 68 in the male die 54 is a slide block 70 having a flange 72 at the end opposite to the cavity 56. One end of a pair of springs 74—74 abut against the flange 72 to normally urge the slide block 70 in its retracted position, i.e. toward the left-hand side in the figure. A rod 76 is slidably inserted in a guide hole 78 formed in the male die 54 and extending perpendicularly to the hollow space 68. The rod 76 is moved within the guide hole 78 by a hydraulic cylinder 80 and has a slant surface 82 which is in contact with a beveled end 84 of the slide block 70 in such a manner that a downward movement of the rod 76 causes the slide block 70 to advance against the elastic force of the springs 74.

In an molding operation using the above apparatus, the injected molten resin first flows into the runner 60 from the sprue 62 and then into the cavity 56 via the gate 58 and the chamber 64 via the passage 66. As the gate 58 is larger than the passage 66 in dimension and provides less resistance to the flow of resin, most of the resin flows into the cavity 56 while only a part thereof into the chamber 64. This must be taken into consideration when an operator determines the amount of resin to be injected, so that the cavity 56 may be supplied with the resin of an amount corresponding to or slightly larger than the amount required for molding the product. Thereafter, the rod 76 is lowered by the cylinder 80 to advance the slide block 70 as shown in FIG. 5, whereby the cavity 56 is filled up with the resin to mold the product having the predetermined thin portion as described hereinabove. In case that the amount of resin injected into the cavity 56 exceeds the reduced volume thereof in FIG. 5, the excess of the resin flows back to the runner 60 through the gate 58 and further flows into the chamber 64 via the passage 66. As in the above embodiment, if the injection molding machine allows the cavity 56 to be supplied with the precise amount of resin, the chamber 64 can be omitted.

FIG. 6 illustrates an apparatus according to another embodiment of the invention, this apparatus being similar to that of FIG. 4 and therefore the same or corresponding parts being indicated by the same reference numerals. In this embodiment, the male die 54 is drilled to provide a bore 86 extending up to the runner 60 and a closure rod 88 is slidably and fluid-tightly fitted in the bore 86. The bore 86 has at the end opposite to the runner 60 an enlarged portion 90 for accommodating a flange 92 of the closure rod 88 and a spring 94 which urges the rod 88 toward the left-hand side in the figure. A piston 96 of a hydraulic cylinder 98 abuts against the flange 92 to normally maintain the closure rod 88 in its advanced position where the bore 86 is completely closed by the rod 88, with the front end surface of the latter being flush with the bottom of the male die 54 defining the runner 60.

For carrying out a molding operation, the dies 50 are closed and the slide block 70 as well as the closure rod 88 is first set to the position shown in FIG. 6. Then a molten resin is injected into the cavity 56 through the sprue 62, runner 60 and the gate 58. The injection molding machine (not shown) should be so arranged that the amount of resin to be supplied into the cavity 56 exceeds the amount necessary for the molding of product. However, in order to avoid the over packing of the cavity 56 by the advance of the slide block 70 as described below, the cavity 56 preferably is not entirely filled with the resin. A desirable rate of an uncharged area depends on a size of the slide block 70 and a distance of advance thereof, and in the illustrated embodiment the amount of the injected resin is so adjusted that about a quarter (¼) of the initial volume of the cavity 56 is left uncharged.

Thereafter and before the injected resin is solidified, the slide block 70 is advanced by the rod 76 as shown in FIG. 7 so that the cavity 56 reduces the volume and becomes filled up with the resin to mold the product, as in the above embodiment. At the same time, the cylinder 98 is actuated to retract the piston 96, which also causes the rod 88 to retract by the force of the spring 94. By this movement, the front end portion of the bore 86 is opened to define a space 100 which communicates with the runner 60 and permits the resin to flow thereinto from the runner 60. Therefore, as the volume of the cavity 56 reduces, excess of the resin can flow back into the runner 60 through the gate 58, thus avoiding over packing of the cavity 56.

Preferably, the rod 88 is again advanced by the cylinder 98 as soon as the slide block 70 reaches its advanced position. This increases the pressure in the resin which is transmitted to the cavity 56 via the runner 60 and the gate 58, whereby a shrinkage during the cooling can be supplemented to advantageously prevent occurrence of sink marks on the product.

In a modification illustrated in FIGS. 8 and 9, the slide block 70 and the closure rod 88 are moved by the common drive means. That is, the guide hole 78 in the male die 54 is elongated to extend beyond the bore 86 and the rod 76 includes an extension 102 having a second slant surface 104 which is inclined in a direction opposite to that of the first slant surface 82. The flange 92 of the closure rod 88 also has a beveled end 106 complementary to and abutting against the second slant surface 104. Thus, the downward movement of the rod 76 causes the slide block 70 to advance against the springs 74 while permitting the closure rod 88 to retract by the force of the spring 94, as shown in FIG. 9.

FIG. 10 shows another arrangement for the resin receiving space, in which a bore 108 is formed as a continuation of the sprue 60 at the opposite side of the gate and is adapted to be closed or opened by a closure rod 110.

An apparatus of FIG. 11 is similar to the apparatus of FIG. 4 in that a hollow space 112 is provided in the female die 52 and communicated with the runner 60 via the passage 66 which is smaller in dimension than the gate 58. The space 112 has a volume substantially less than the volume of the space 64 in FIG. 4. A bore 114 is drilled in the male die 54 to extend up to the space 112 and is normally closed by a closure rod 116 which is secured in position by a spring 118 and a shaft 120 having a flange 122. The amount of resin to be injected is so determined that the cavity 56 may receive the resin of substantially larger amount than required for the molding of product while the space 112 is almost filled with the resin. When the volume of cavity 56 is reduced by the advance of the slide block 70, excess of the resin flows back into the runner 60 through the gate 58 and then into the space 112 via the passage 66. The internal pressure of the space 112 is thus increased, causing the closure rod 116 to retract against the spring 118 with opening the bore 114. One of advantages of these arrangements is that the space 112 and an opened portion of the bore 114 is positively filled with the resin, which promotes the cooling of the resin.

FIG. 12 illustrates a modified form of the apparatus of FIG. 1 having the pin point gate. Because the small dimension of the pin point gate 20 permits the injected resin to quickly solidify at the gate, it is necessary to provide an outlet for discharging the excess of resin separately from the gate 20. In this apparatus, an inverted L-shaped passage 124 is formed in an ejector pin 126 mounted in the male die 14 to communicate the peripheral portion of the cavity 16 with a hollow space 128 in the male die 14. One end of the passage 124 opening to the cavity 16 is located at the reverse side of the product to be molded, which may improve an external appearance of the product.

As it should be understood from the foregoing description, according to the invention the thin portion is formed by the advance of the slide block after the resin is injected into the cavity. This enables to mold the product having thin portion of a desired thickness positively and efficiently without involving the problems that have been encountered in the prior art technique. The injection-molded product according to the invention includes the thin portion of less than 1 mm thickness, allowing reduction of size and weight of a final product.

Although the present invention has been described with reference to the preferred embodiments thereof, many modifications and alterations may be made within the spirit of the invention.

What is claimed is:

1. An apparatus for injection molding a product having a partly thin portion comprising:
   a molding die including a male die and a female die for defining a cavity therebetween, said cavity having a volume larger than a volume of the product, and said molding die further including a gate for injecting a molten resin material from an injection molding machine into said cavity;
   a slide block disposed in one of said male die and said female die and having in cross section a dimension corresponding to a dimension of the thin portion of the product, and said slide block being movable between a retracted position whereat the volume of said cavity is substantially maintained and an advanced position to project into said cavity thereby reducing the volume of said cavity for forming the thin portion;
   drive means for moving said slide block, said drive means being adapted to advance said slide block before the resin material injected into said cavity is solidified;
   a hollow space formed in said molding die and communicating with said cavity for permitting an excess of the resin material to be discharged from said cavity into said hollow space during the advance of said slide block;
   a closure member fitted in said hollow space for normally closing the same; and
   closure member drive means comprising spring means for urging said closure member to a retracted position and a power drive unit for maintaining said closure member in an advanced position against said spring means, said closure member driving said closure member in synchronism with said slide block drive means, whereby said closure member is retracted to open said hollow space substantially simultaneously with the advance of said slide block and is advanced to reduce a volume of said hollow space immediately after said slide block reaches said advanced position.

2. An apparatus as claimed in claim 1, wherein said gate comprising a pin point gate opening substantially at a center of said cavity and said hollow space is formed adjacent said cavity, and further comprising a passage for connecting said cavity to said hollow space.

3. An apparatus as claimed in claim 2, wherein said passage is an inverted L-shape.

4. An apparatus as claimed in claim 1, wherein said gate comprises a side gate opening at a periphery of said cavity and connected to the injection molding machine through a runner, and wherein said hollow space is formed adjacent said runner.

5. An apparatus as claimed in claim 4, further comprising a passage for connecting said runner to said hollow space, said passage having a dimension smaller than a dimension of said side gate for increasing resistance to flow of the resin material into said hollow space.

6. An apparatus as claimed in claim 1, wherein said slide block drive means comprises a shaft connected to said slide block at the end opposite to said cavity and an actuator for causing said shaft to reciprocate.

7. An apparatus as claimed in claim 1, wherein said slide block drive means comprises spring means for urging said slide block to said retracted position, a beveled end surface of said slide block, a rod member extending perpendicularly to said slide block and having a slant surface abutting said beveled end surface whereby the forward movement of said rod member advances said slide block, and an actuator for causing said rod member to reciprocate.

8. An apparatus as claimed in claim 1, wherein said drive means includes a reciprocating rod member having a first slant surface adapted to advance said slide block upon forward movement of said rod member and a second slant surface of said rod member for permitting said closure member to retract upon said forward movement of said rod member.

9. An apparatus as claimed in claim 1, wherein said power drive unit includes a hydraulic cylinder and a piston connected at one end of said hydraulic cylinder and at the other end to said closure member.

* * * * *